United States Patent [19]
Gambale et al.

[11] Patent Number: 4,853,458
[45] Date of Patent: Aug. 1, 1989

[54] CARBOXY-FUNCTIONALIZED POLYCARBONATE FROM CARBOXYPHENOL

[75] Inventors: Ronald J. Gambale, Clifton Park; Susan J. Hathaway, Albany; Kathryn L. Longley, Saratoga Springs; Timothy J. Ullman, Niskayuna, all of N.Y.

[73] Assignee: General Electric Company, Schenectady, N.Y.

[21] Appl. No.: 109,873

[22] Filed: Oct. 19, 1987

[51] Int. Cl.$^4$ .............................................. C08G 63/62
[52] U.S. Cl. .................................... 528/198; 528/193; 528/195; 528/204; 528/373
[58] Field of Search ............... 528/198, 193, 195, 204, 528/373

[56] References Cited

U.S. PATENT DOCUMENTS 4,556,704  12/1985  Rosenquist .......................... 528/198

Primary Examiner—Harold D. Anderson
Attorney, Agent, or Firm—William H. Pittman; James C. Davis, Jr.

[57] ABSTRACT

Carboxy-functionalized polycarbonates are prepared by incorporating a carboxylic acid-substituted phenol, preferably t-butyl p-hydroxybenzoate, as a chainstopper in a polycarbonate-forming reaction. The products are capable of forming copolymers with other polymers such as polyamides and functionalized olefin polymers, by generation of a carboxy group which reacts therewith.

17 Claims, No Drawings

CARBOXY-FUNCTIONALIZED POLYCARBONATE FROM CARBOXYPHENOL

This invention relates to the carboxy-functionalization of polycarbonates.

The superior physical properties of polycarbonates render the useful in a large number of application areas. However, polycarbonates are deficient in certain properties such as solvent resistance. Therefore, there is considerable activity in the development of blends of polycarbonates with other polymers which modify their properties. Illustrative polymers of this type are polyamides and olefin polymers.

The blends thus prepared are, however, often themselves deficient in properties due to the imcompatability of the polymers comprising them. Thus, blends of polycarbonates and polyamides or olefin polymers tend to delaminate severely. It is expected that the compatibility of such blends could be improved by incorporating therein, in various proportions, a copolymer of the blend constituents. The formation of such copolymers requires the presence of functional groups on the polycarbonate which are capable of undergoing reaction with the other polymer. Thus, the functionalization of polycarbonates is a prime concern relative to the preparation of copolymers therefrom.

An illustrative method of functionalizing polycarbonates is disclosed and claimed in copending, commonly owned application Ser. No. 939,391, filed Dec. 8, 1986, now U.S. Pat. No. 4,732,934. In this method, a hydroxy-terminated polycarbonate is caused to react with tricarboxylic acid derivative such as trimellitic anhydride acid chloride. Said method is, however, disadvantageous to a certain extent because it requires the use of special procedures to prepare a hydroxy-terminated polycarbonate, followed by an additional reaction (usually in solution) with the tricarboxylic acid derivative to form the functionalized polycarbonate.

Interest continues, therefore, in simplifying the procedures for preparing functionalized polycarbonates. One possible expedient is the employment of a functionalized chain termination agent in the preparation of the polycarbonate. The use of chain termination agents such as phenol and t-butylphenol is known in the art. Also known by way of disclosure in German Offenlegungsschrift 3,445,108 is the use as a chain termination agent of a phenol containing an olefinic functional group. However, methods for carboxy-functionalization of polycarbonates by means of chain termination agents have not been previously disclosed.

The present invention provides a class of carboxy-functionalized polycarbonates. This class of polycarbonates may be conveniently prepared by the incorporation of a carboxy-functionalized phenol as a chain termination agent in a conventional system for interfacial preparation of polycarbonates.

In one of its aspects, therefore, the present invention includes carboxy-functionalized polycarbonates containing end groups of the formula

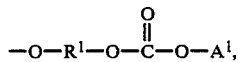
(I)

wherein $R^1$ is a divalent aliphatic, alicyclic or aromatic radical and $A^1$ is a carboxylic acid-substituted phenyl group or a functional derivative thereof.

The carboxy-functionalized polycarbonates of this invention generally comprise structural units of the formula

(II)

wherein each $R^1$ is independently as defined hereinabove. The $R^1$ values may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, poly-1,4-(2-butenylene), poly-1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 60% and more preferably at least about 80% of the total number of $R^1$ values in the polycarbonate, and most desirably all of said $R^1$ values, are aromatic. The aromatic $R^1$ radicals preferably have the formula

(III)

wherein each of $A^2$ and $A^3$ is a monocyclic divalent aromatic radical and Y is a bridging radical in which one or two atoms separate $A^2$ from $A^3$. The free valence bonds in formula III are usually in the meta or para positions of $A^2$ and $A^3$ in relation to Y. Such $R^1$ values may be considered as being derived from bisphenols of the formula HO—$A^2$—Y—$A^3$—OH. Frequent reference to bisphenols will be made hereinafter, but it should be understood that $R^1$ values derived from suitable componds other than bisphenols may be employed as appropriate.

In formula III, the $A^2$ and $A^3$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated radical such as methylene, cyclohexylmethylene, 2-[2.2.2]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals for 2,2-dichloroethylidene, carbonyl, oxy, thio and sulfone. For reasons of availability and particular suitability for the purposes of this invention, the preferred radical of formula III is the 2,2-bis(4-phenylene)-propane radical, which is derived from bisphenol A and in which Y is isopropylidene and $A^2$ and $A^3$ are each p-phenylene.

As is apparent from formula I, the end groups on the carboxy-functionalized polycarbonates of this invention are $A^1$ values which are carboxylic acid-substituted phenyl groups or functional derivatives thereof. Both mono- and polycarboxylic acid-substituted phenol groups are included, with mono- and dicarboxylic acid-substituted groups being preferred and monocarboxylic acid-substituted groups being especially preferred. The functional derivatives which are particularly contemplated are ester, anhydride and imide groups.

A particularly preferred class of $A^1$ values consists of those having the formulas

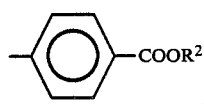

(IV)

and

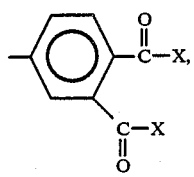

(V)

wherein $R^2$ is hydrogen, $C_{1-6}$ alkyl or phenyl and each X is independently OH, $C_{1-6}$ alkoxy or phenoxy or both X radicals taken together are O or N—$R^2$. Thus, the preferred end groups are p-carboxylic acid-substituted groups or esters thereof and 3,4-dicarboxylic acid-substituted groups or esters, anhydrides or imides thereof. Especially desirable, for reasons described hereinafter, are end groups of formula IV wherein $R^2$ is a $C_{4-6}$ tertiary alkyl radical containing at least one β-hydrogen atom.

The carboxy-functionalized polycarbonates of this invention may be prepared by incorporating a carboxylated phenol of the formula $A^1$-OH as a chainstopper in a polycarbonate-forming reaction between a carbonate source and at least one dihydroxy compound of the formula $R^1(OH)_2$. This method is another aspect of the invention.

Any known polycarbonate-forming reaction employing dihydroxy compounds, especially bisphenols, may be employed in the method of this invention. Typical reactions of this type include transesterification reactions, in which the dihydroxy compound is caused to react with a carbonate ester such as dihydroxy compound is caused to react with phosgene in a two-phase liquid system comprising water and an inert organic solvent. The interfacial method is frequently preferred. It is well known in the art and is generally conducted under highly alkaline conditions, most often in the presence of a catalytic amount of an amine such as triethylamine.

The proportion of chainstopper in the polycarbonate-forming reaction mixture will depend to a considerable extent on the molecular weight of the polycarbonate desired. It is generally in the range of about 1–10 mole percent, preferably about 2–7 mole percent, based on dihydroxy compound.

The preparation of the carboxy-functionalized polycarbonates of this invention is illustrated by the following examples.

EXAMPLES 1–6

Mixtures of 29.1 grams (128 mmol.) of bisphenol A, 65 ml. of methylene chloride, 55 ml. of water, 2.58 ml. of triethylamine in the form of a 5% w/v solution in methylene chloride, and various amounts of carboxylated phenols were stirred at room temperature and a 50% aqueous solution of sodium hydroxide was added to bring the pH to 11. Phosgene was then passed through the mixtures for 18–22 minutes at 0.8 gram per minute, with maintenance of the pH at 11, to provide a 25% excess of phosgene. Additional methylene chloride was added as necessary to control the viscosity.

When the reaction was complete, the organic phase was removed and washed once with 7% aqueous hydrochloric acid solution and three times with water. The desired carboxy-functionalized polycarbonates were precipitated into methanol, filtered and dried in vacuum.

The products obtained are listed in the following table. Mole percentages of carboxylated phenol are based on bisphenol A. Molecular weights were determined by gel permeation chromatography.

| Example | $A^1$ | Mole % carboxylate phenol | Product Mw | Mw/Mn |
|---|---|---|---|---|
| 1 | —⟨○⟩—COOH | 3.5 | 56,000 | 5.6 |
| 2 | —⟨○⟩—COOCH₃ | 3.7 | 57,200 | 5.4 |
| 3 | —⟨○⟩—COOC(CH₃)₃ | 3.5 | 62,600 | 3.6 |
| 4 | —⟨○⟩—COOC₆H₅ | 3.0 | 50,700 | 4.2 |
| 5 | —⟨○⟩—COOCH₃ with COOCH₃ | 3.7 | 39,500 | 6.2 |

| Example | A¹ | Mole % carboxylate phenol | Product Mw | Mw/Mn |
|---|---|---|---|---|
| 6 | 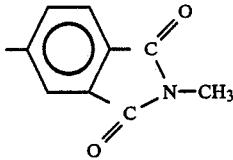 | 4.0 | 40,500 | 4.0 |

The carboxy-functionalized polycarbonates of this invention may be made to react with nucleophilic polymers other than polycarbonates, such as amine-terminated polyamides and functionalized olefin polymers, to form copolymers having desirable properties. Such copolymers are in turn useful as compatibilizers for blends of the same polymers. This method of copolymer formation is another aspect of the invention.

Copolymer formation may frequently be achieved by heating the carboxy-functionalized polycarbonates with the other polymer in solution or in the melt, at temperatures in the range of about 150°-300° C. Following the reaction, non-copolymerized polycarbonate may be removed by dissolution in a suitable solvent such as chloroform; the insoluble material includes the desired copolymer.

The above-described procedure is particularly useful with polycarbonates containing carboxylic acid end groups, which may be produced from materials having ester or imide end groups or the like by conventional acid-catalyzed hydrolysis reactions. Alkaline catalysis should be avoided because of its tendency to degrade the polycarbonate.

A more convenient method for generating carboxylic acid-functionalized polycarbonates employs compositions of this invention in which $A^1$ has formula IV and $R^2$ is a tertiary alkyl radical, especially t-butyl. Such polycarbonates may be thermally converted to carboxylic acid-terminated polycarbonates, under conditions similar to those encountered in an extruder or similar conventional melt blending equipment. Thus, copolymer formation is possible by melt blending, either in a two-step sequence in which the first step produces the carboxylic acid-functionalized polycarbonate and the second step produces the copolymer, or in a single extrusion under conditions promoting both reactions.

The preparation of copolymers from the carboxylate-functionalized polycarbonates of this invention is illustrated by the following examples.

EXAMPLE 7

A solution of 6 grams of the product of Example 3 in 120 ml. of 1,2,3,4-tetrachlorobenzene was heated at 260° C. for 2 hours, after which the polymer was precipitated therefrom by pouring into an excess of methanol. The product was slurried in methanol, filtered and dried under vacuum. It was shown by proton nuclear magnetic resonance to contain a substantial proportion of carboxylic acid end groups, and had a weight average molecular weight of 61,600.

A solution of 4 grams of the carboxylic acid-functionalized polycarbonate, 4 grams of a commercially available glycidyl methacrylate-grafted EPDM copolymer and 0.17 ml. of triphenyl phosphite in 80 ml. of 1,2,4-trichlorobenzene was heated under reflux for 2 hours and the polymer was precipitated by pouring into an excess of methanol in a blender. The polymer was washed with methanol, slurried and dried in a vacuum oven at 80° C. A 7.494-gram portion thereof was continuously extracted with chloroform in a Soxhlet extractor for 18 hours to remove polycarbonate homopolymer. A total of 41% of the polycarbonate was thus recovered, indicating a 59% conversion to copolymer. The residue was vacuum dried and pressed into a film which was shown by infrared spectroscopy to contain both polycarbonate and methacrylate moieties.

EXAMPLE 8

A product similar to that of Example 3, but having a weight average molecular weight of 74,700 was extruded in a twin-screw extruder at temperatures in the range of 115°-274° C. The extrudate was quenched in water, air dried, pelletized and dried in an oven at 100° C. It had a molecular weight of 62,600 and was shown by proton nuclear magnetic resonance to contain a substantial proportion of free carboxylic acid groups.

A mixture of 350 grams of the carboxylic acid-functionalized polycarbonate, 350 grams of the glycidyl methacrylate-grafted EPDM copolymer of Example 7 and 5.91 ml. of triphenylphosphite was tumble mixed and extruded on a twin screw extruder at temperatures in the range of 115°-268° C. Upon workup and chloroform extraction as in Example 7, 44% of the polycarbonate was recovered by dissolution, indicating 56% conversion to copolymer. The copolymer was spectroscopically analyzed, with results similar to those of Example 7.

What is claimed is:

1. A carboxy-functionalized polycarbonate containing end groups of the formula

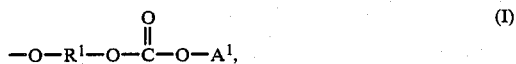 (I)

wherein each $R^1$ is independently a divalent aliphatic, alicyclic or aromatic radical and $A^1$ is a carboxylic acid-substituted phenyl group or an ester, anhydride or imide derivative thereof.

2. A polycarbonate according to claim 1 which comprises structural units of the formula

 (II)

3. A polycarbonate according to claim 2 wherein $A^1$ is a mono- or dicarboxylic acid-substituted phenyl group or an ester, anhydride or imide derivative thereof.

4. A polycarbonate according to claim 3 wherein at least about 60% of the total number of $R^1$ radicals are aromatic hydrocarbon radicals.

5. A polycarbonate according to claim 4 wherein each $R^1$ has the formula

 (III)

wherein each of $A^2$ and $A^3$ is a monocyclic divalent aromatic radical and Y is a bridging radical in which one or two atoms separate $A^2$ from $A^3$.

6. A polycarbonate according to claim 5 wherein $A^1$ has the formula

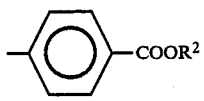
(IV)

or

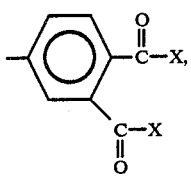
(V)

wherein $R^2$ is hydrogen, $C_{1-6}$ alkyl or phenyl and each X is independently OH, $C_{1-6}$ alkoxy or phenoxy or both X radicals taken together are O or N—$R^2$.

7. A polycarbonate according to claim 6 wherein Y is isopropylidene and $A^2$ and $A^3$ are each p-phenylene.

8. A polycarbonate according to claim 7 wherein $A^1$ has formula IV and $R^2$ is a $C_{4-6}$ tertiary alkyl radical containing at least one β-hydrogen atom.

9. A method for preparing a carboxy-functionalized polycarbonate according to claim 1 which comprises incorporating a carboxylated phenol of the formula $A^1$—OH as a chainstopper in a polycarbonate-forming reaction between a carbonate source and at least one dihydroxy compound of the formula $R^1(OH)_2$.

10. A method according to claim 9 wherein $A^1$ is a mono- or dicarboxylic acid-substituted phenyl group or functional derivative thereof and at least about 60% of the total number of $R^1$ radicals are aromatic hydrocarbon radicals.

11. A method according to claim 10 wherein the carbonate source is phosgene.

12. A method according to claim 11 wherein each $R^1$ has the formula $$-A^2-Y-A^3-, \quad (III)$$

wherein each of $A^2$ and $A^3$ is a monocyclic divalent aromatic radical and Y is a bridging radical in which one or two atoms separate $A^2$ and $A^3$.

13. A method according to claim 12 wherein $A^1$ contains an ester, anhydride or imide group.

14. A method according to claim 13 wherein $A^1$ has the formula

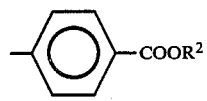
(IV)

or

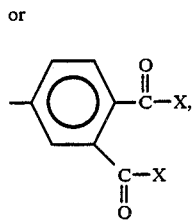
(V)

wherein $R^2$ is hydrogen, $C_{1-6}$ alkyl or phenyl and each X is independently OH, $C_{1-6}$ alkoxy or phenoxy or both X radicals taken together are O or N—$R^2$.

15. A method according to claim 14 wherein the proportion of chainstopper in the polycarbonate-forming reaction mixture is in the range of about 2–7 mole percent, based on dihydroxy compound.

16. A method according to claim 15 wherein Y is isopropylidene and $A^2$ and $A^3$ are each p-phenylene.

17. A method according to claim 16 wherein $A^1$ has formula IV and $R^2$ is a $C_{4-6}$ tertiary alkyl radical containing at least one β-hydrogen atom.

* * * * *